(12) United States Patent
Yu et al.

(10) Patent No.: US 9,185,465 B2
(45) Date of Patent: Nov. 10, 2015

(54) IMPLEMENTING MEDIA REQUESTS VIA A ONE-WAY SET-TOP BOX

(71) Applicant: CISCO TECHNOLOGY, INC., San Jose, CA (US)

(72) Inventors: Yuqiang Yu, Shanghai (CN); Qi Wang, Shanghai (CN)

(73) Assignee: Cisco Technology, Inc., San Jose, CA (US)

( * ) Notice: Subject to any disclaimer, the term of this patent is extended or adjusted under 35 U.S.C. 154(b) by 71 days.

(21) Appl. No.: 14/049,856

(22) Filed: Oct. 9, 2013

(65) Prior Publication Data
US 2015/0095936 A1    Apr. 2, 2015

(30) Foreign Application Priority Data
Sep. 27, 2013    (CN) .......................... 2013 1 0446783

(51) Int. Cl.
| | |
|---|---|
| *H04N 7/173* | (2011.01) |
| *H04N 21/61* | (2011.01) |
| *H04N 21/41* | (2011.01) |
| *H04N 21/433* | (2011.01) |
| *H04N 21/482* | (2011.01) |
| *H04N 21/6377* | (2011.01) |
| *H04N 21/422* | (2011.01) |
| *H04N 21/441* | (2011.01) |

(52) U.S. Cl.
CPC ....... *H04N 21/6125* (2013.01); *H04N 21/4126* (2013.01); *H04N 21/4334* (2013.01); *H04N 21/482* (2013.01); *H04N 21/6175* (2013.01); *H04N 21/6181* (2013.01); *H04N 21/6377* (2013.01); *H04N 21/42221* (2013.01); *H04N 21/441* (2013.01)

(58) Field of Classification Search
CPC .................... H04N 21/6125; H04N 21/47202; H04N 21/41407; H04N 21/472; H04N 21/6131; H04N 21/482; H04N 5/44543; H04N 21/4622; H04N 21/4126
USPC ............................ 725/28, 105, 133, 141, 153
See application file for complete search history.

(56) References Cited

U.S. PATENT DOCUMENTS

| | | | |
|---|---|---|---|
| 2002/0138830 A1* | 9/2002 | Nagaoka et al. ................. | 725/14 |
| 2005/0028208 A1* | 2/2005 | Ellis et al. ......................... | 725/58 |
| 2009/0222874 A1* | 9/2009 | White et al. .................... | 725/118 |
| 2010/0162335 A1* | 6/2010 | Davis ............................. | 725/110 |
| 2012/0159538 A1* | 6/2012 | Phillips et al. .................. | 725/34 |
| 2012/0239132 A1* | 9/2012 | Naor et al. .................... | 623/1.14 |
| 2013/0081096 A1 | 3/2013 | Wells et al. | |
| 2013/0145409 A1 | 6/2013 | Vince | |

* cited by examiner

*Primary Examiner* — Oleg Asanbayev
(74) *Attorney, Agent, or Firm* — Merchant & Gould P.C.

(57) ABSTRACT

A method can include initiating a video request via an application operating on a smart device. The method can also include transmitting the video request to a service provider from the smart device via a network to enable transmission of configuration information to a one-way set-top box and to enable transmission of video content corresponding to media content associated with the video request to the one-way set-top box based on the configuration information.

14 Claims, 4 Drawing Sheets

IMPLEMENTING MEDIA REQUESTS VIA A ONE-WAY SET-TOP BOX

TECHNICAL FIELD

This disclosure relates to implementing media requests via a one-way set-top box.

BACKGROUND

Various media providers provide customers with one or more set-top boxes to receive content that can be presented on a display device, such as a television. The type of media content that can be presented generally depends on the capabilities of the set-top box. For example, a one-way set-top box can generally only receive and tune broadcast channels over a forward path. In contrast, a two-way set-top box provides bidirectional communications that enables a user to communicate via a reverse path as well as to receive content over the forward path. While advanced features may be available with a two-way set-top box, such options come at an extra cost.

DESCRIPTION OF EXAMPLE EMBODIMENTS

Overview

This disclosure relates to implementing media requests to enable a one-way set-top box.

In one example, a method can include initiating a video request via an application operating on a smart device. The method can also include transmitting the video request to a service provider from the smart device via a network to enable transmission of video content associated with the video request to a one-way set-top box. The method can further include receiving configuration information at the smart device to enable the one-way set-top box to process the video content based on the configuration information.

In another example, a method can include receiving at a service provider via a network a video request from a smart device, the video request enabling identification of a one-way set-top box to which video content corresponding to the video request is to be provided. The video request can be authorized based on at least one of user authentication and predetermined user preferences. A streaming request can be provided to a video server in response to the authorization, and video content corresponding to the video request can be transmitted to the one-way set-top box over a broadcast network.

In yet another example, executable instructions can be stored in a non-transitory computer readable medium. The executable instructions can include a user interface configured to enable a user to send a request from a smart device to a service provider via a network to initiate a transmission of media content to a one-way set-top box via a broadcast frequency in response to the request and based on configuration information. The user interface can include a control interface configured to enable the user to selectively control delivery of the media content in substantially real time in response to a user input. The executable instructions can also include a configuration component configured to control a short-range communication interface to transmit the configuration information from the smart device to the one-way set-top box.

Example Embodiments

Figure 1:
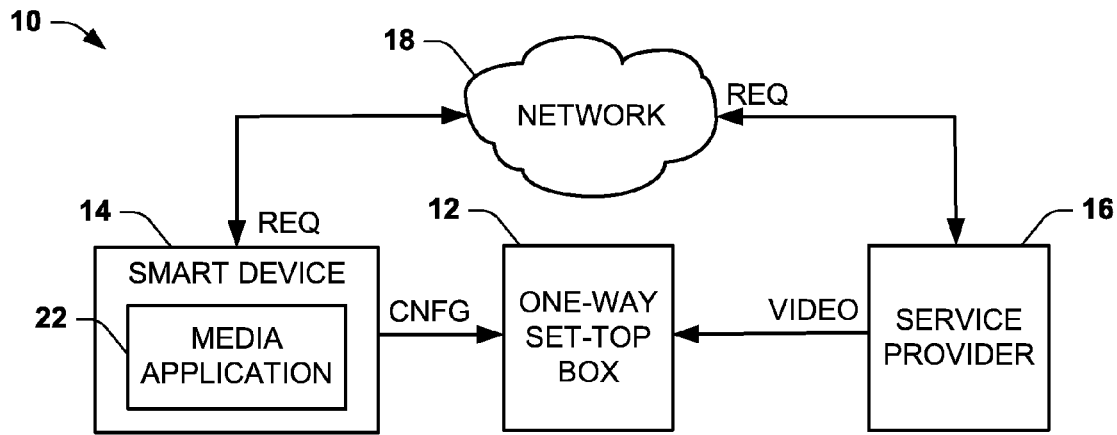
FIG. 1 illustrates an example of a network system that enables a one-way set-top box to exhibit two-way functionality.

FIG. 1 illustrates an example of a network system 10. The network system 10 can correspond to a combination of networks that includes a broadcast media network. For example, the broadcast media network could be implemented as a cable access network (e.g., a hybrid-fiber cable (HFC) network) or a satellite television network. The network system 10 can be configured to implement video requests for providing media content to a one-way set-top box 12. As an example, the one-way set-top box 12 can be coupled to the broadcast media network via a coaxial cable.

As used herein, a one-way set-top box refers to a set-top box that includes one or more tuners for demodulating and decoding broadcast media received over a forward path, but is unable to send signals upstream over a reverse path that comprises the same media utilized for the forward path. The one-way set-top box can be a standalone unit that is external to a display device or it can be integrated into a display device, such as can be built into the display device or be removably attached to the display device (e.g., a card or peripheral inserted into a corresponding receptacle).

The network system 10 includes a smart device 14 that is configured to enable a user to initiate a video request for the media content to a service provider 16 via a network 18. As described herein, the term "smart device" refers to any of a variety of electronic devices that can initiate a software request for the media content, and that can connect to the network 18 to transmit the software request to the service provider 16. For example, the smart device 14 can include a personal computer (e.g., a laptop or tablet computer), a smart telephone, personal digital assistant, a specially configured remote control device or any other device that can connect to the network 18. The smart device 14 is also separate from and can communicate locally with the one-way set-top box 12, such as via a short-range wireless link (e.g., infrared or other wireless remote control technology).

In the example of FIG. 1, the smart device 14 includes a media application 22. As an example, the smart device 14 can store the media application 22 in memory (e.g., a non-transitory computer readable medium) from which the media application 22 can be executed (e.g., by a processor core). For instance, the smart device 14 can download the media application 22 from the service provider 16 or from an application marketplace via the network 18. As another example, the media application 22 can be hosted on a remote computer, such as a website that is accessible and executable from the network 18. The user of the smart device 14 can use the media application 22 to initiate video requests for the media content to be transmitted to the one-way set-top box 12.

As an example, the user can implement the media application 22 that provides a user interface to select a specific item of media content, such as from a list (e.g., a catalog) of available media content selections. As described herein, the term "media content" describes any of a variety of combination video and/or audio data that can be provided on the one-way set-top box 12 for the enjoyment and/or entertainment of the user. For example, the media content can include motion pictures, television shows, music, video games, or any of a variety of other video and/or audio content that can be provided to the one-way set-top box 12. In response the user selecting the media content, the smart device 14 transmits a video request, such as initiated by the user, to the service provider 16 via the network 18, demonstrated in the example of FIG. 1 as a REQ. As an example, the network 18 can include a local area network, a wide area network (e.g., the Internet) or a combination of LAN and WAN, which may include physical and/or wireless communications links. For instance, the smart device 14 can connect to the Internet via a Wi-Fi hotspot or via the cellular data network to transmit the video request REQ to the service provider 16. The video request REQ can include a variety of data, such as data identifying the selected media content and authentication data associated with the smart device 14, the user and/or the set-top box 12. For example, prior to initiating the video request, the user can register the smart device and the set-top box with the service provider 16.

In response to the video request REQ, the service provider 16 can be configured to provide a video stream VIDEO to the one-way set-top box 12 that includes the media content selected by the user in the request REQ. The video stream VIDEO can be transmitted on a prescribed frequency as part of a broadcast transmission. For example, the video stream VIDEO can be a motion picture experts group (MPEG) encoded video stream that is transmitted on the prescribed frequency, such as in a broadcast, multicast, or unicast manner. For example, the video stream VIDEO can be provided in a unicast manner to a single one-way set-top box 12 in response to a single user request for the media content. As another example, the video stream VIDEO can be provided to multiple one-way set-top boxes 12 substantially concurrently, such as in response to multiple requests for the same media content within a given period of time. As yet another example, the video stream VIDEO can be provided in a broadcast manner in response to one or more requests for the media content, such as on a given broadcast channel that is only accessible in response to the requests.

The video stream VIDEO can be provided to the one-way set-top box 12 based on predetermined configuration information, such as including a frequency (e.g., a specified quadrature amplitude modulation (QAM) frequency), program identification (Program ID), session identification, and/or a variety of other broadcast configuration information. The configuration information can be provided to the one-way set-top box 12 to enable the one-way set-top box to receive the video stream VIDEO, decode the signal and provide it for display on an associated display device (e.g., a television). For example, the smart device 14 can provide the configuration information to the one-way set-top box 12 via a wireless signal, demonstrated in the example of FIG. 1 as a signal CNFG. As an example, the media application 22 can be configured to access a communication interface of the smart device 14 (e.g., an infrared (IR) transmitter) to communicate the configuration information CNFG the one-way set-top box 12. The configuration information CNFG can control the one-way set-top box 12 to tune to the appropriate frequency to receive the video content VIDEO to provide the media content to the user.

Therefore, as described in the example of FIG. 1, a user can initiate media requests to be provided to a one-way set-top box to emulate the functionality of a two-way set-top box. As a result, the user can experience the versatility and variety of streaming digital media, such as is typically only provided via personal computing devices, but instead through a broadcast media stream. Therefore, the user can enjoy the requested media content on a larger screen, as is typical with consumer television sets, and thus with a greater associated viewing definition available via typical broadcast video content. Furthermore, because the requested media content is provided via the broadcast to a legacy one-way set-top box, the system can be implemented in an inexpensive manner (compared to two-way set-top boxes) based on the functionality for initiating and controlling the requests being performed through the media application 22 and some minor back office functions provided by the service provider 16.

Additionally, as disclosed herein, the user can utilize the media application 22 to emulate the functionality of a digital video recorder (DVR) or provide Cloud rendering of the media control in substantially real time. The smart device 14 can thus be utilized to transmit control instructions to the service provider 16 via the network 18 in response to a user input. The service provider 16 can employ the control instructions to selectively control delivery of the video content, such as in a unicast transmission of the video content, to provide remote-control device functionality in substantially real-time with respect to the media content. Such remote control functionality can include various functions such as stop, pause, play, fast-forward, rewind, and other types of control of the media content that can be applied by the service provider 16 to the video provided to the one-way set-top box 12. For example, in response to a pause instruction, the service provider can repeatedly send a given frame of video until another control instruction is received or predetermined duration has been exceeded. Such remote-control device functionality can be implemented, for example, to emulate the functions of a DVR, Cloud TV rendering, Cloud-based gaming, and a variety of other types of controllable audio and/or video with respect to the media content. As used herein, in the context of remote control functionality, the term "substantially" refers to an immediate response a user input, but still can allow for some latency, such as due to communication and processing of the remote control instruction and downstream transmission of the resulting broadcast media stream to the user's set-top box.

Figure 2:
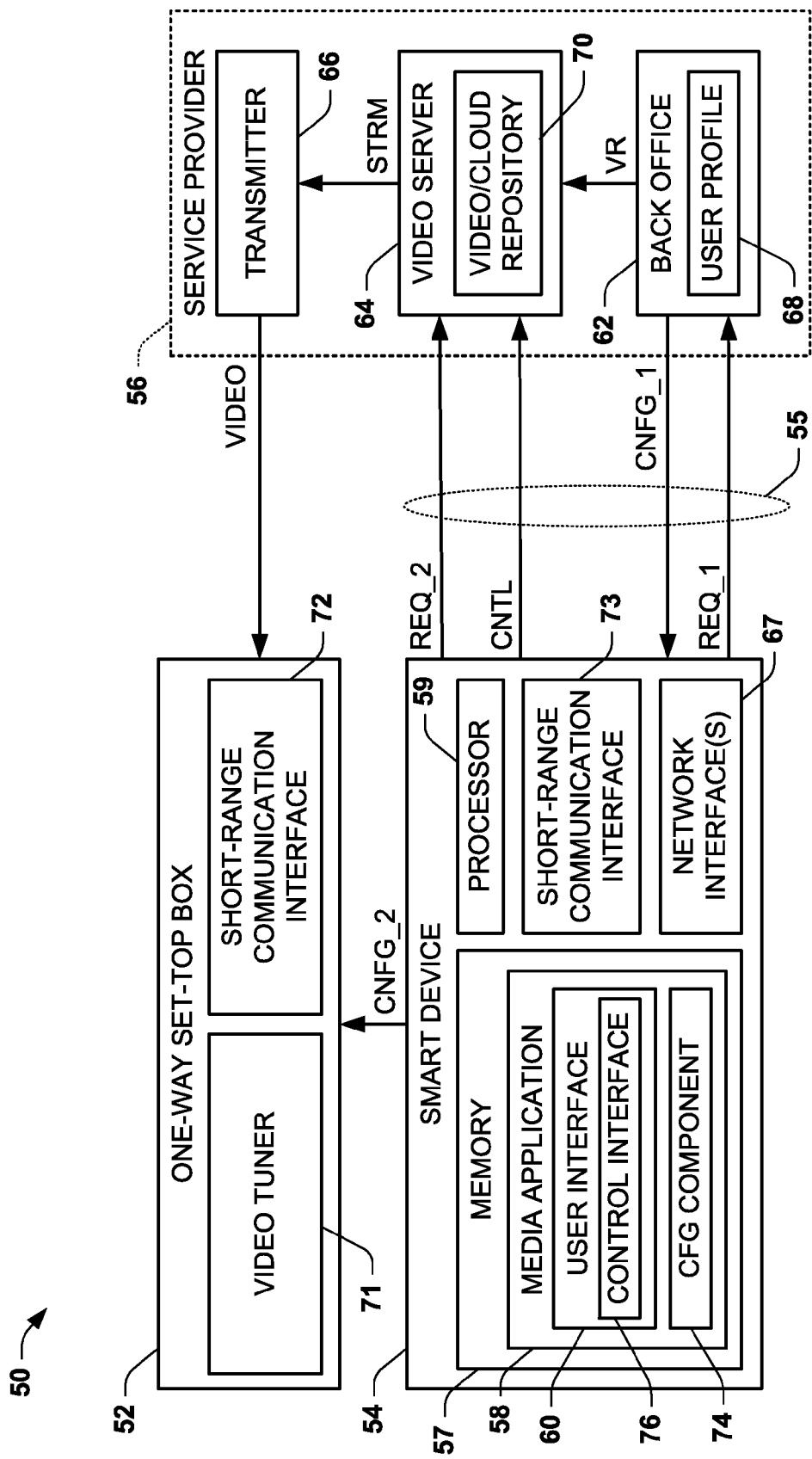
FIG. 2 illustrates another example of a network system.

FIG. 2 illustrates another example of a network system 50. The network system 50 can correspond to one or more various types of networks, which includes a broadcast media network. The broadcast media network, for example, can include a cable access network, (e.g., a hybrid-fiber cable (HFC) network), a broadcast satellite network as well as other broadcast media delivery networks. The network system 50 demonstrates an example of the network system 10 in the example of FIG. 1. Thus, similar to as described previously regarding the example of FIG. 1, the network system 50 can be configured to implement video requests for providing media content for a one-way set-top box 52, such as similar to an on-demand manner of providing the media content.

The network system 50 includes a smart device 54 that is configured to enable a user to initiate a video request for the media content to a service provider 56 via a network (e.g., the Internet) 55. In the example of FIG. 2, the smart device 54 includes a memory 57 configured to store and enable execution of a media application 58. The memory 57 can be a non-transitory storage medium, such as non-volatile or volatile storage media. As an example, the smart device 54 can be configured to download the media application 58 from the service provider 56 or from a media application marketplace via the network (e.g., the Internet or via a cloud service connection). In the example of FIG. 2, the smart device includes a processor (e.g., one or more processor cores) configured to access the memory 57 and to execute the media application 58. Thereafter, the user of the smart device 54 can implement the media application 58 to initiate video requests for media content to be selectively provided for receipt by the one-way set-top box 52.

In the example of FIG. 2, the media application 58 includes a user interface 60 that can include a variety of different screens and interactive components that allow the user to interact with the media application 58. As an example, the user can implement the user interface 60 to select a specific item of media content, such as from a catalog of available media content selections. As disclosed herein, the media content can include motion pictures, television shows, music, interactive video games, or any of a variety of other video and/or audio content that can be provided by the service provider.

Figure 3:
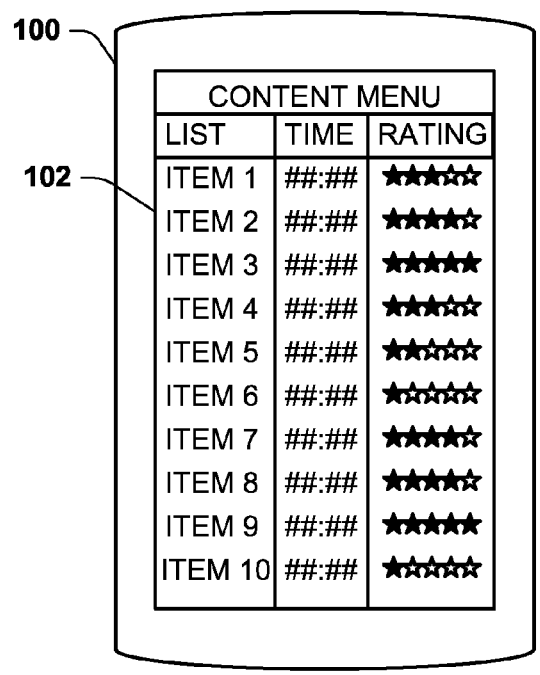
FIG. 3 illustrates an example of a smart device and a user interface.

FIG. 3 illustrates an example of a smart device 100. In the example of FIG. 3, the smart device 100 is demonstrated as a smart phone or a smart tablet computer; however, as disclosed herein the smart device can be implemented as a variety of other form factors. In the example of FIG. 3, the smart device 100 provides a graphical user interface that includes a content menu 102 that can correspond to a given one or more screens of the user interface 60 (FIG. 2). The content menu 102 can include a list of items of media content that can be selected by the user (e.g., via a touch screen (finger or stylus) or selection buttons), as well as details about each of the items of media content. In the example of FIG. 3, the details about the items of media content include a running time and a rating, but can instead include more, less, or different details regarding each of the items of media content (e.g., cost, genre, resolution etc.). As an example, the media application 58 can be configurable by the user, such that the content menu 102 can be programmable by the user with respect to the number and details of items of media content. As another example, the content menu 102 can include submenus that can organize the list of items of media content based on type, source, content, or a variety of other ways that are available to the user, such as based on the user's contract with the service provider 56.

Referring back to the example of FIG. 2, the service provider 56 includes a back office 62, a video server 64, and a transmitter 66. In response to the user selecting the media content, the smart device 54 can transmit a video request to the service provider 56 such as via the network 55. The information provided in the video request can vary according to a predetermined data format (e.g., an XML schema or application interface specification). The smart device 54 includes one or more network interfaces 67 configured to communicate with the associated network 55 directly via a bidirectional network communication protocol such that each video request can be transmitted from the smart device 54 via the network interface(s) 67. As an example, the network interface(s) 67 can be configured to transmit each video request via a wireless network. For example, the network interface(s) 67 can include a cellular data network interface, a Wi-Fi network interface (e.g., based on one of the Institute of Electrical and Electronics Engineers (IEEE) 802.11 standards), a Bluetooth interface, or a variety of other wireless and/or physical interfaces to communicate via the associated network 55. In some examples, the network interface 67 can include both a cellular data network interface and a Wi-Fi network interface, and other controls operating in the smart device 54 can automatically or manually select which interface(s) is utilized for communicating with the service provider 56 via the network 55.

The video request provided from the smart device 54 can include more than one request message, which can be sent to more than one recipient associated with the service provider 56. As demonstrated in the example of FIG. 2, REQ_1 is provided to the back office 62 and the video request REQ_2 is provided to the video server 64. The video request REQ_1 can correspond to user authentication and/or user preference data, as well as contain the request for the media content. The video request REQ_2 can correspond to the selected item of the media content and can include a session ID as well as a corresponding play request to initiate the transmission, for example. As an example, the video requests REQ_1 and REQ_2 can be initiated concurrently or sequentially, and can be initiated by the user automatically in response to selection of an item of media content, such as from the content menu 102 in the example of FIG. 3. Alternatively, the video requests REQ_1 and REQ_2 can be initiated after selection of the item of media content, such as based on login verification and/or confirmation of selection. Additionally, the video requests REQ_1 and REQ_2 are demonstrated separately based on separate functional interaction of the back office 62 and the video server 64, but could be included in a single communication to the service provider 56. For instance, after authorizing the video request received from the smart device 54, the back office 62 can be configured to extract selected information from the video request (e.g., the Media ID and control (e.g., play) instructions) and provide such selected information to the video server 64.

In response to receiving the video request REQ_1, the back office 62 can be configured to authorize the video request REQ_1. For example, the authorization can include verifying user authentication information and/or applying user preferences against the video request REQ_1. In the example of FIG. 2, the back office 62 includes user profile data 68 that can include subscriber information regarding the user, such as can be implemented for the authorization based on the data in the video request REQ_1. For example, the user profile data 68 can include billing information, username and password information, and/or information regarding a Quality of Service (QoS) based on the contract of the user with the service provider 56. The back office 62 can also be configured to assign transmission parameters associated with the media content session, such as a broadcast frequency channel, a PID, a session ID, a service ID, symbol rate, and/or other data associated with the delivery of the media content.

In response to authorization of the video request REQ_1, the back office 62 can provide a video streaming request VR to the video server 64 (e.g., a video-on-demand (VOD) server). The video streaming request VR can indicate the authorization of the video request REQ_1 to the video server 64. In response to the video streaming request VR, the video server 64 can be programmed to access the media content from a video/cloud services repository 70, which may be local as shown or be distributed and separate from the service provider 56. The media content can be specified in the video request REQ_2 for the given session ID provided in the video request REQ_2 and/or be specified in the video streaming request VR. As an example, the video/cloud services repository 70 can include all available media that can be provided in all available formats. The media content in the video/cloud services repository 70 can be dedicated for delivery to any number of recipients, which can include the one-way set-top box 52 as well as other types of devices. The video streaming request VR can also specify the format requested by the video request REQ_1 and/or allowed by the user profile data 68 (e.g., standard definition (SD) or high-definition (HD)), and can specify the transmission parameters corresponding to delivery of the requested media content, including an identification of the destination for the requested content (e.g., IP address and UDP port of the transmitter).

The video server 64 can thus provide the media content requested by the video request REQ_2 to the transmitter 66 via a media data stream STRM. There can be any number of one or more video servers or other resources that can provide streaming digital media to the transmitter 66. As an example, the transmitter 66 can be a QAM transmitter, and the video server 64 can stream the media content accessed from the video/cloud repository 70 to a user data protocol (UDP)/Internet protocol (IP) port, such as established by the back office 62 via the video streaming request VR. The transmitter 66 can thus transmit video content VIDEO, corresponding to the stream of media content STRM, to the one-way set-top box 52 via a broadcast transmission according to specified transmission parameters. The transmission parameters can correspond to configuration information associated with the delivery of the requested media content. The video content VIDEO can be decoded via a video tuner 71 in the one-way set-top box 52 to provide the video stream VIDEO to an associated output device (e.g., a television) as the requested media content. The tuner 71 can be configured to decode the provided video, which can include analog video, digital video or a combination of analog and digital video signals based on configuration information. Accordingly, the media content can be displayed for enjoyment by the user.

The parameters for delivery of the requested media content can be predetermined based on the configuration of the one-way set-top box 52, such as at installation, or can be provided to the one-way set-top box 52. For example, upon authorization of the video request REQ_1, the back office 62 can be configured to transmit configuration information corresponding to the parameters for delivery of the requested media content to the smart device 54, demonstrated in the example of FIG. 2 as CNFG_1. For example, the configuration information CNFG_1 can be transmitted to the smart device 54 via the same network 55 across which the video requests REQ_1 and REQ_2 were transmitted (e.g., the Internet via a cellular or Wi-Fi network). As an example, the configuration information CNFG_1 can specify the transmission parameters associated with delivery of the requested media content VIDEO, such as matching the parameters provided to the video server 64 via the video streaming request VR. The configuration information CNFG_1 can specify one of a plurality of different predetermined channels to which the set-top box 52 or the configuration information CNFG_1 can explicitly include the respective parameters utilized by the set-top box for tuning to the receive the requested video content VIDEO. As an example, the specified predetermined channel can be one of a plurality of hidden channels (e.g., reserved for VOD usage), such as cannot be accessed by a typical remote control device associated with the one-way set-top box 52. As a further example, the transmission parameters for the specified channel can include frequency channel (e.g., QAM frequency), the PID, the session ID, the service ID, the symbol rate, and/or the other data for the provided video content VIDEO.

In the example of FIG. 2, the media application 58 includes a configuration component 74. In response to receiving the configuration information CNFG_1, the configuration component 74 can retransmit the configuration information to the one-way set-top box 52 via a short-range communication interface 73. For instance, the short-range communication interface 73 can be a line of sight wireless transmitter (e.g., an infrared transmitter) or other short-range interface (e.g., Bluetooth interface). In the example of FIG. 2, the one-way set-top box 52 includes a short-range communication interface (e.g., a receiver) 74 that is configured for user control of the one-way set-top box 52, such as via a typical remote control for power, channel selection, volume control, DVR/Cloud-based media functionality, and a variety of other typical remote control functions. For example, the short-range communication interface 72 of the set-top box 52 can be an infrared (IR) receiver for controlling operation of the one-way set-top box 52 in response to IR commands received from a remote control device, such as the smart device 54 or other control device. Therefore, the configuration component 74 can be configured to access the short-range communication interface 73 of the smart device 54 (e.g., an IR transmitter) to transmit the configuration information to the one-way set-top box 52 via the short-range communication interface 72, demonstrated in the example of FIG. 2 as via a signal CNFG_2.

For example, the configuration component 74 can be configured to convert at least a portion of the configuration information CNFG_1 received at the smart device from the back office 62 to the corresponding configuration information CNFG_2 that is provided to the short-range communication interface 72. That is, the configuration information CNFG_2 can include a proper subset (e.g., less than) or be provided in a different format from that of the configuration information CNFG_1 received from the back office 62. For example, the configuration component 74 can include a look-up table to perform the conversion. The particular form and type of configuration information CNFG_2 is adapted based on the operating requirements of the one-way set-top box as to enable the one-way set-top box to receive and process (e.g., tune) the requested media content that is transmitted. In other examples, the CNFG_2 provided to the set-top box can be the same as configuration information CNFG_1.

As an example, the transfer of the configuration information CNFG_1 received from the back office 62 to the one-way set-top box 52 as the configuration information CNFG_2 can be substantially automatic, such that the transfer is transparent to the user or prompted by the media application 58 via instructions (such as based on proximity to the one-way set-top box 52). Alternatively, the configuration information CNFG_1 can be provided to the smart device 54, and corresponding instructions can be displayed on GUI provided by the media application 58. A user thus can, based on the instructions, implement another existing remote control device for the one-way set-top box 52 to manually provide appropriate configuration parameters to the one-way set-top box 52 via the communication interface 72. As yet another example, a user can employ a human machine interface that is built into the one-way set-top box 52 to enter one or more configuration parameters into the set-top box. Accordingly, the one-way set-top box 52 can be properly tuned via the video tuner 71 to receive the video content VIDEO provided by the transmitter 66, decode the video content and provide a corresponding display output.

As an example, the video content VIDEO that is provided to the one-way set-top box 52 can be provided continuously without interruption or, if available, it can be interactive with existing DVR/Cloud-based media control functionality of the one-way set-top box 52. As another example, the media application 58 can be further configured to control the video content VIDEO as to emulate remote control functionality similar to interactive DVR/Cloud-based media control functionality with respect to the media content, such as without having to store the media content on an associated hard-drive (not shown) on the one-way set-top box 52.

In the example of FIG. 2, the user interface 60 of the media application 58 includes a control interface 76 that is configured to enable the user to control delivery of the video content provided to the one-way set-top box 52 to substantially emulate the functionality of DVR/Cloud-based media control in substantially real time (e.g., with delays less than one minute). Using the control interface 76, the user can provide control commands (e.g., pause, stop, play, fast-forward, rewind) that are transmitted to the video server 64, demonstrated as CNTL. As a result, the video server 64 can adjust the data stream STRM based on the control commands CNTL. In addition, the video server 64 and/or the back office 62 can be configured to save a play history of a viewing session (e.g., such as identified by a user ID and/or a media ID), such that the video server 64 and/or the back office 62 can intelligently start the video stream VIDEO from the last view point when the same user (e.g., via the same one-way set-top box 52) wants to watch the same media content at later time or date. Accordingly, the media application 58 can substantially emulate DVR/Cloud-based media control functionality to provide for real time control of the user-selected media content provided VIDEO to the one-way set-top box 52. While this remote-control DVR/Cloud-based media control functionality has been described with respect to video content that is initiated in response to a video request from the smart device 54, such functionality can also be applied to any content authorized to be viewed by the one-way set-top box. Additionally, the smart device 54 can be used to initiate a user-selected transmission for receipt by other types of set-top boxes (e.g., a two-way set-top box), such as to provide a back-up solution in the event that reverse path for such set-top box has been compromised. Thus, in this context, one-way would imply the current inability of the set-top box to send control signals upstream over a reverse path.

Figure 4:
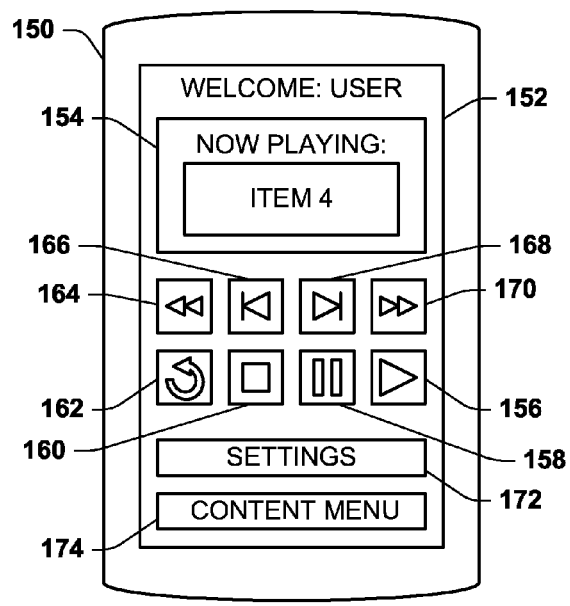
FIG. 4 illustrates another example of a smart device and another user interface.

FIG. 4 illustrates another example of a smart device 150. In the example of FIG. 4, the smart device 150 is demonstrated as a smart phone or a tablet computer. The smart device 150 includes a control interface 152 that can correspond to a given one or more screens of the user interface 60 (FIG. 2). For example, the control interface 152 can include a display portion 154 that indicates information regarding the user-requested media content currently playing on the one-way set-top box 52. Such information can include an identification of the media content, chapter, current running time, time remaining, and/or a variety of other information. The control interface 152 also includes a variety of control components, which when activated in response to a user input, cause corresponding control instructions to be provided via a network to a video server that is providing the media content (e.g., CNTL sent via network 55 to video server 64 of FIG. 2). In the example of FIG. 4, the control components include a play button 156, a pause button 158, a stop button 160, a skip-back button 162, a rewind button 164, a chapter rewind button 166, a chapter advance button 168, and a fast-forward button 170. Thus, the control interface 152 includes control components that afford remote control features for controlling delivery of the video content substantially similar to a DVR or other Cloud-based media control. The control interface 152 could include additional or less media content control features.

Additionally, the control interface 152 includes a settings menu 172, such as to allow the user to access other features, such as closed-caption or video settings. Furthermore, the control interface 152 can include a button 174 that can access the content menu, such as the content menu 102 in the example of FIG. 3. Accordingly, substantially all control of the process of selecting the media content, initiating the video request, and controlling the media content can be performed via the media application 58 operating on the smart device 150.

Figure 5:
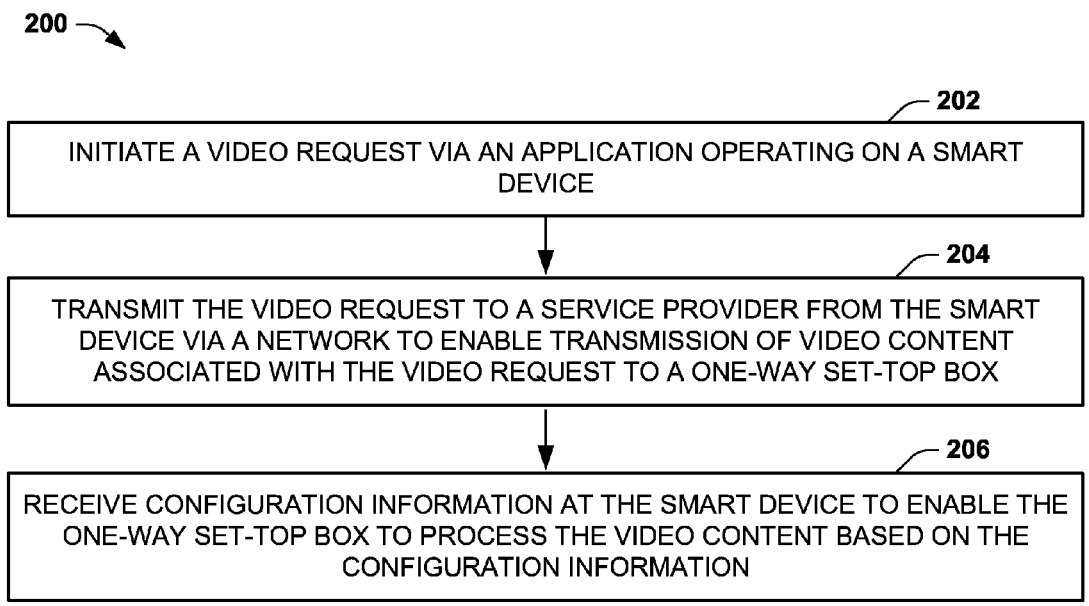
FIG. 5 illustrates an example of a method for requesting media content.
Figure 6:
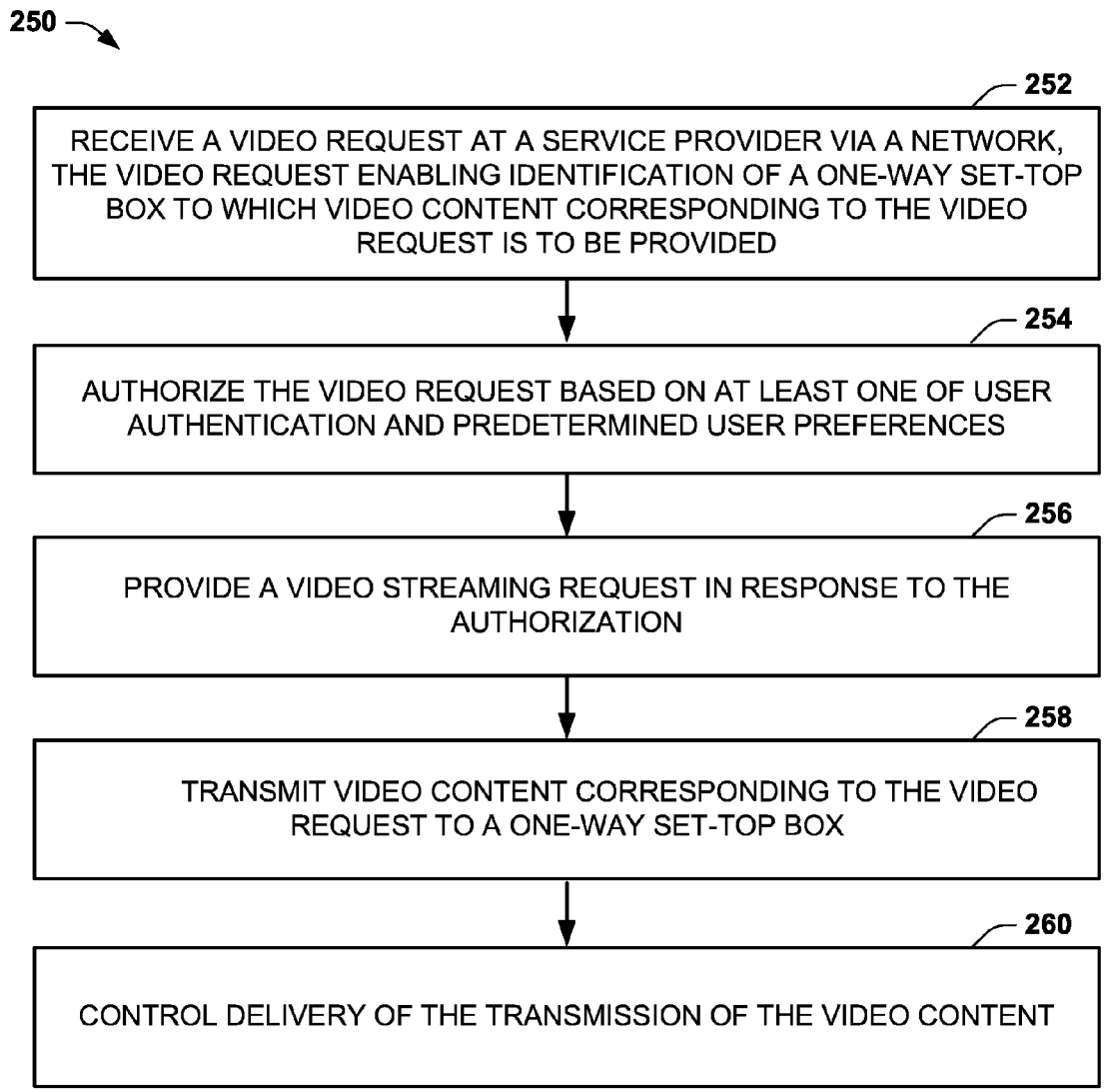
FIG. 6 illustrates an example of a method for providing media content.

In view of the foregoing structural and functional features described above, methods that can be implemented will be better appreciated with reference to FIGS. 5 and 6. While, for purposes of simplicity of explanation, the methods of FIGS. 5 and 6 are shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a method in accordance with an aspect of the present invention. The methods or portions thereof can be implemented as instructions stored in a non-transitory storage medium as well as be executed by a processor of a computer device, for example.

FIG. 5 illustrates an example of a method 200 for requesting and initiating transmission of media content. The method can be implemented at a smart device, such as disclosed herein (e.g., the smart device 14 of FIG. 1 or 54 of FIG. 2). When the method 200 begins, the smart device has been preregistered with a service provider to enable communication of command and control instructions between the smart device and the service provider. At 202, a video request (e.g., the video requests REQ_1 and REQ_2 of FIG. 2) is initiated via an application (e.g., the media application 22 of FIG. 2) operating on a smart device (e.g., the smart device 14 of FIG. 1 or 54 of FIG. 2). The request can be selected by a user in response to a user input via a GUI, for example. At 204, the video request is transmitted to a service provider (e.g., the service provider 16 of FIG. 1 or 56 of FIG. 2) from the smart device via a network (e.g., the network 18 of FIG. 1 or 55 of FIG. 2) to enable transmission of video content (e.g., the video content VIDEO of FIGS. 1 and 2) associated with the video request to a one-way set-top box (e.g., the one-way set-top box 12). As disclosed herein, the video request is to enable transmission of configuration information (e.g., the configuration information CNFG) to a one-way set-top box and to enable transmission of a video content (e.g., the video content VIDEO), corresponding to content associated with the video request, to the one-way set-top box based on the configuration information. At 206, configuration information (e.g., the configuration information CNFG) is received at the smart device to enable the one-way set-top box to process the video content based on the configuration information. As disclosed herein, additional commands, such as remote control commands, can be provided from the smart device to the service provider via the network to control playout of the requested media that is provided to and received by the set-top box.

FIG. 6 illustrates an example of a method 250 for providing media content. In the example of FIG. 6, the method can be performed by a service provider (e.g., service provider 16 of FIG. 1 or 56 of FIG. 2). At 252, a video request (e.g., the video requests REQ_1 and REQ_2) is received at the service provider (e.g., the service provider 16 of FIG. 1 or 56 of FIG. 2) via a network (e.g., the network 18 of FIG. 1 or 55 of FIG. 2), where the video request enables identification of a one-way set-top box (e.g., the one-way set-top box 12 of FIG. 1 or 52 of FIG. 2) to which video content (e.g., the video content VIDEO of FIG. 1 or 2) corresponding to the video request is to be provided. For example, the video request is provided from a smart device (e.g., the smart device 14 of FIG. 1 or 54 of FIG. 2) that has been registered for requesting media content for an associated set-top box.

At 254, the video request is authorized based on at least one of user authentication and predetermined user preferences, such as according to pre-registration information established for the smart device and a service level agreement. At 256, a video streaming request (e.g., the video streaming request VR) is provided in response to the authorization. The authorization can be provided to a video server (e.g., the video server 64). The authorization can include configuration parameters identifying the requested media content as well as transmission related parameters for controlling transmission of the media content (e.g., QAM frequency, a PID, a session ID, a service ID, symbol rate or the like).

At 258, video content corresponding to the video request is transmitted for receipt and display at a one-way set-top box. The transmission occurs over a network that is different from the network over which the video request is received. Additionally, as disclosed herein, the configuration parameters can also be sent to the set-top box to enable receipt and display of the requested video. For instance, the service provider can provide the configuration parameters to the smart device that provided the video request, which in turn can control the set-top box for receiving the provided video.

At 260, the delivery of the transmitted video can be controlled. For example, the service provider can implement the controls at a headend of a network system, such as in response to control instructions received from the smart device via the network. The control of the provided video can include DVR-like functions (e.g., stop, pause, play, forward, rewind and the like).

What have been described above are examples. It is, of course, not possible to describe every conceivable combination of components or methods, but one of ordinary skill in the art will recognize that many further combinations and permutations are possible. Accordingly, the invention is intended to embrace all such alterations, modifications, and variations that fall within the scope of this application, including the appended claims.

Where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, the term "including" means including but not limited to. The term "based on" means based at least in part on.

What is claimed is:

1. A method comprising:
   initiating a video request via an application operating on a smart device;
   transmitting the video request to a service provider from the smart device via an Internet network to enable transmission of video content associated with the video request to a one-way set-top box over a broadcast network;
   wherein transmitting the video request to the service provider comprises: transmitting the video request to a back office associated with the service provider; authorizing access to the content identified by the video request based on a least one of user authentication and predetermined user preferences; and transmitting a service request to a video server associated with the service provider to access the video content and enable the video content corresponding to the video request to be provided over the broadcast network for receipt by the one-way set-top box based on the configuration information;
   receiving, via the Internet network in response to transmitting the video request, configuration information at the smart device to enable the one-way set-top box to process the video content based on the configuration information, the configuration information comprising a specified quadrature amplitude modulation (QAM) frequency on which to receive the video content, a program identification (ID) corresponding to the video content, and a session identification; and
   providing, in response to receiving the configuration information, the configuration information to the one-way set-top box to enable the one-way set-top box to tune to receive the video content over the broadcast network, wherein providing the configuration information comprises communicating the configuration information from the smart device to the one-way set-top box via a short-range communication interface associated with a user control of the one-way set-top box.

2. The method of claim 1, wherein the short-range communication interface comprises an infrared (IR) interface.

3. The method of claim 1, further comprising transmitting a remote control instruction to the service provider in response to a user input via the smart device to selectively control delivery of the video content to provide substantially real-time remote-control device functionality with respect to the video content.

4. The method of claim 3, wherein transmitting the remote control instruction comprises transmitting the remote control instruction wherein the remote control instruction comprising at least one of the following: stop, pause, play, forward and rewind.

5. The method of claim 1, wherein initiating the video request comprises selecting the video content associated with the video request via the application operating on the smart device.

6. The method of claim 1, further comprising downloading the application via the Internet network, the application being executable via the smart device to initiate the video request and to selectively control delivery of the video content associated with the video content via control instructions that are transmitted to by the smart device over the Internet network.

7. The system comprising:
   a smart device;
   a service provider;
   a back office;
   a one-way set-top box;
   the smart device, initiating a video request via an application;
   the smart device transmitting the video request to the service provider via an Internet network to enable transmission of video content associated with the video request to the one-way set-top box over a broadcast network;
   wherein transmitting the video request to the service provider comprises: the smart device, transmitting the video request to the back office associated with the service provider; authorizing access to the content identified by the video request based on a least one of user authentication and predetermined user preferences;
   the back office, transmitting a service request to a video server associated with the service provider to access the video content and enable the video content corresponding to the video request to be provided over the broadcast network for receipt by the one-way set-top box based on the configuration information;
   the smart device, receiving, via the Internet network in response to transmitting the video request, configuration information to enable the one-way set-top box to process the video content based on the configuration information, the configuration information comprising a specified quadrature amplitude modulation (QAM) frequency on which to receive the video content, a program identification (ID) corresponding to the video content, and a session identification; and the smart device, providing, in response to receiving the configuration information, the configuration information to the one-way set-top box to enable the one-way set-top box to tune to receive the video content over the broadcast network, wherein providing the configuration information comprises communicating the configuration information from the smart device to the one-way set-top box via a short-range communication interface associated with a user control of the one-way set-top box.

8. The system of claim 7, wherein transmitting the video content comprises: streaming motion picture experts group (MPEG) encoded data over a transport stream from the video server to a transmitter; and transmitting the video content on a selected broadcast frequency, corresponding to configuration information associated with the video request, to the one-way set-top box.

9. The system of claim 7, further comprising storing a user profile associated with the one-way set-top box, the user profile comprising session data associated with the video content to enable control of the video content in approximately real-time in response to control instructions received from the smart device via the first network.

10. The system of claim 7, further comprising transmitting configuration data to the smart device via the first network for configuring the one-way set-top box to receive the video content via a communication interface associated with the user control of the one-way set-top box.

11. A non-transitory computer-readable medium comprising executable instructions, the executable instructions comprising:
a user interface configured to send a media request from a smart device to a service provider in response to a user input, the request being sent via an Internet network to initiate a transmission of media content to a one-way set-top box over a broadcast network;
wherein the media request comprises: a media content selection corresponding to the media content; and user authentication data and predetermined user preferences data to enable authorization of the request to enable the transmission of the media content to the one-way set-top box;
wherein sending the media request to the service provider comprises: sending the media request to a back office associated with the service provider; authorizing access to the content identified by the media request based on a least one of user authentication and predetermined user preferences;
transmitting a service request to a video server associated with the service provider to access the media content and enable the media content corresponding to the media request to be provided over the broadcast network for receipt by the one-way set-top box based on configuration information; and
a configuration component configured to receive the configuration information at the smart device to enable the one-way set-top box to process the media content based on the configuration information, and configured to transmit the configuration information from the smart device to the one-way set-top box, wherein the configuration component is configured to control a short-range communication interface to transmit the configuration information to the one-way set-top box wherein the configuration component is further configured to convert at least a portion of the configuration information received at the smart device to corresponding configuration information that is provided to the short-range communication interface for transmission to the one-way set-top box, the configuration information comprising a specified quadrature amplitude modulation (QAM) frequency on which to receive the video content, a program identification (ID) corresponding to the video content, and a session identification.

12. The medium of claim 11, wherein the short-range communication interface comprises an infrared transmitter.

13. The medium of claim 11, wherein the user interface comprises a control interface configured to enable the user to selectively control delivery of the media content to the one-way set-top box in substantially real time in response to another user input.

14. The medium of claim 11, wherein the user interface further comprises a content menu configured to enable the user to select the media content identified in the request, the request comprising a media content selection.

* * * * *